2,905,655

CARBON DISULFIDE-PHENYLENEDIAMINE REACTION PRODUCTS IN RUBBER

Harry E. Albert, Akron, Ohio, assignor to The Firestone Tire & Rubber Company, Akron, Ohio, a corporation of Ohio No Drawing. Application January 31, 1956
Serial No. 562,598

8 Claims. (Cl. 260—45.9)

This invention relates to reaction products of carbon disulfide and substituted phenylenediamines and their use in rubber. These reaction products serve as antiozonants in rubber.

The carbon disulfide appears to form a dithiocarbamic acid grouping. Two or more of the resultant compounds may unite, and it is probable that this involves ring formation.

The substituted ortho- and para-phenylenediamines from which the antiozonants are formed have the formula $RNH.C_6H_4.NHR'$ in which R and R' are each from the class of substituents composed of alkyl groups containing 1 to 12 carbon atoms, and cycloalkyl groups of not more than 12 carbon atoms, such as cyclohexyl, etc.

The disubstituted phenylenediamines from which the antiozonants of this invention are formed are themselves antiozonants. However, many members of this class of compounds are extremely toxic and for this reason are impossible to handle in commercial operations.

Likewise the reaction products are less volatile than the substituted phenylenediamines and remain longer in the rubber and have a more lasting effect.

Oxygen and ozone both have a harmful effect on rubber, but the effect of each is different, and compounds which inhibit or prevent the harmful effect on one are not necessarily effective in stopping or retarding the harmful effect of the other.

Crabtree and Kemp in an article in Industrial and Engineering Chemistry, vol. 38, starting at page 278 (1946), explain the difference in the action of oxygen and ozone on rubber. The light-catalyzed oxidation which occurs during outdoor exposure forms a skin and crazed appearance over the exposed surface of the rubber. Ozone, on the other hand, even in very low concentration, induces cracking in rubber, but only if the rubber is stretched (C. H. Leigh-Dugmore, Rubber Age and Synthetics, November and December 1952). The cracks are perpendicular to the direction of stretch. Such cracking can occur in the absence of light. The compounds which inhibit ozone deterioration of rubber are referred to herein as antiozonants.

Tires are stressed when inflated. While a tire is at rest it is stretched statically, and on a moving vehicle it is stretched dynamically, i.e., it undergoes alternating stretching and relaxing. Some of the antiozonants are more effective in static tests and others are more effective in dynamic tests. Antiozonants which are effective under both conditions will be desired for tires, but for other rubber products an antiozonant which does not meet both tests may be used.

The inhibiting effect of the antiozonants of this invention on rubber was determined by treatment of unaged, cured stocks with air of controlled ozone content in specially designed equipment, and also by outdoor exposure to natural weathering. The tests were conducted with one-half inch dumbbell samples of approximately 100 gauge thickness. The special apparatus for testing with air of controlled ozone content, and the method of testing therein are described in the articles by Ford and Cooper, appearing in India Rubber World for September and October 1951, entitled "A Study of the Factors Affecting the Weathering of Rubber-like Materials, I and II." The following reports refer to tests in which the ozone concentration was maintained at 60 parts per 100,000,000 at different temperatures and for different periods of time, as indicated in the tables of results. Two types of tests were conducted. In one type, called the dynamic test, the sample was repeatedly stretched between the limits of 0 and 20 percent elongation at the rate of 108 cycles per minute. In the other type of test, the static test, the samples were stretched at 12.5 percent elongation throughout the test. On completion of each test the number and size of the cracks in each sample were compared visually with the number and size of the cracks in a blank strip from the same masterbatch which contained no antiozonant and which was cured and tested at the same time as the test sample. The number of cracks was reported on an arbitrary scale as follows: "none," "very few," "few," "moderate," "moderate-to-numerous" (or "mod.-num."), and "numerous." The size of the cracks was reported according to an arbitrary scale as follows: "very slight," "slight," "moderate," "severe," and "very severe."

In all of the reported rubber tests 2.0 parts by weight of an antiozonant were added to the control formula or masterbatch for each 100 parts of rubber present. The reported results include data on the tensile properties of the cured rubber stocks before and after aging in an oven under the conditions stated. The modulus and tensile strength are given in pounds per square inch, and the elongation is reported as percent of stretch at the break. These data are included to show that the antiozonants have no substantial deleterious effect upon the cure or upon the aging of the cured stocks.

The antiozonants are effective in the vulcanizates of both natural and synthetic rubbers, as, for example, those produced by polymerizing or copolymerizing a conjugated diene, as for example, 1,3-butadiene (or hydrocarbon homologue thereof) with a vinyl monomer as, for example, styrene, acrylonitrile, methacrylonitrile, or an ester of vinyl alcohol, an ester of acrylic or methacrylic acid, vinylpyridine, vinylcarbazole or other low-molecular-weight vinyl monomer.

The rubber can be vulcanized with sulfur or a sulfur donor or with a cross-linking agent such as a dithiol, nitro- or nitroso-compound, etc. Known vulcanization accelerators are useful in speeding up the vulcanization process and are operative herein, especially the relatively active accelerators of sulfur vulcanization, including the thiazole sulfenamides, e.g., N-cyclohexyl-2-benzothiazolesulfenamide, thiazoline sulfenamides, thiocarbamyl sulfenamides, mercaptothiazoles, mercaptothiazolines, thiazolyl mono- and di-sulfides, the N,N-disubstituted dithiocarbamates, the thiuram sulfides, the xanthogen sulfides, and metallic salts of mercaptothiazoles or mercaptothiazolines or dithiocarbamic acids.

One or more accelerator activators are often used with any of the accelerators mentioned, and such activators include the various derivatives of guanidine known in the rubber art, amine salts of inorganic and organic acids, various amines themselves, and alkaline salts such as sodium acetate and the like, as well as other activators known in the art. Additionally, two or more accelerators or accelerator combinations are sometimes desirable in a single rubber compound. Many of the accelerators mentioned above are suitable in latex formulations, especially such common accelerators as piperidinium pentamethylene dithiocarbamate, zinc butylxanthate, zinc ethylxanthate, zinc salt of mercaptobenzothiazole, zinc dimethyldithiocarbamate, and zinc dibutyldiethiocarbamate.

Although vulcanization is usually accomplished by heating a vulcanizable rubber composition at a temperature in the range of 240 to 400° F. for a time ranging from several hours to a few seconds, vulcanization does take place at lower temperature such as ordinary room temperature. It is quite common to vulcanize a latex film containing an ultra-accelerator by allowing the film to remain at room temperature for several hours or a few days.

In preparing the antiozonants of this invention, from 0.5 to 2.0 moles of the carbon disulfide are brought into reaction with one mole of the substituted phenylenediamine. The following substituted phenylenediamines are representative of those that may be used in carrying out the invention.

ORTHO- AND PARA-PHENYLENEDIAMINES

N-methyl, N'-sec-butyl
N-sec-butyl, N'-isopropyl
N-octyl, N'-sec-butyl
N-undecyl, N'-sec-butyl
N-ethyl, N'-undecyl
N-ethyl, N'-amyl
N-n-butyl, N'-octyl
N,N'-diethyl
N,N'-diisopropyl
N,N'-dinonyl
N,N'-didodecyl
N,N'-di(1-methylheptyl)
N,N'-di(1-methyloctyl)
N,N'-dicyclooctyl
N-ethyl, N'-cyclopentyl The following examples illustrate the preparation of the reaction products:

EXAMPLE 1

Twenty-two grams (0.1 mole) of N,N'-di-sec-butyl-p-phenylenediamine and 10.0 g. (0.132 mole) of carbon disulfide were mixed and allowed to stand one day. The mixture was then heated on a steam plate and thereafter it was heated on a hot plate to 140° C. Twenty-four grams of a dark brown liquid were obtained. Some crystals separated from the liquid on prolonged standing.

It was found that by standing at room temperature, or by refluxing in alcohol solution, N,N'-di-sec-butyl-p-phenylenediamine reacts slowly with carbon disulfide to give a white crystalline solid which has been shown to be a bisdiethiocarbamate composed from two molecules of N,N'-di-sec-butyl-p-phenylenediamine and two molecules of carbon disulfide. At higher temperatures liquid reaction products are obtained.

EXAMPLE 2

(Method 1)

A reaction mixture of 88 g. (0.4 mole) of N,N'-di-sec-butyl-p-phenylenediamine and 40 g. (0.53 mole) of carbon disulfide was allowed to stand 19 days at room temperature. After the addition of 500 ml. of petroleum ether, the crystalline solid was filtered and washed with petroleum ether. It weighed 31.8 g.

(Method 2)

A reaction mixture consisting of 88.0 g. (0.4 mole) of N,N'-di-sec-butyl-p-phenylenediamine, 40.0 g. (0.53 mole) of carbon disulfide and 150 ml. of ethyl alcohol was refluxed 1 week and then allowed to stand 10 days to permit crystallization. Filtration gave a crude yield of 28.5 g. Successive crystallizations from chloroform-ethyl alcohol, chloroform-petroleum ether and chloroform-n-hexane gave crystals of M.P. 231° (decomposition).

On analysis the above crystalline product produced by the second method of Example 2 was found to be composed as follows:

| | Calculated for bisdithiocarbamate | Found | |
|---|---|---|---|
| | | | Average |
| Molecular weight | 593 | 585, 565 | 575 |
| C_____percent | 60.77 | 60.90, 61.13 | 61.02 |
| H_____do | 8.15 | 8.09, 7.98 | 8.04 |
| N_____do | 9.45 | 9.68, 9.55 | 9.62 |
| S_____do | 21.63 | 21.83, 22.01 | 21.92 |
| Active hydrogen___do | 0.33 | 0.30, 0.30 | 0.30 |

Since agreement with a bisdithiocarbamate structure is good, it is believed that the compound has the following structure:

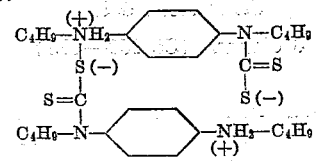

where $C_4H_9-$ is a secondary butyl group.

This is the only structure which can account for the high percentage of sulfur found in the molecule. An isomer of this structure in which both —N—C—S bonds are on one phenylenediamine residue was eliminated from serious consideration because such a structure should yield free N,N'-di-sec-butyl-p-phenylenediamine on treatment with alkali, and the crystalline product of Example 2 did not behave in this manner.

EXAMPLE 3

Eighty-eight grams (0.4 mole) of N,N'-di-sec-butyl-p-phenylenediamine was placed in a 500 ml. flask provided with a thermometer, a motor driven stirrer, a water-cooled reflux condenser and an electric heating mantle controlled by a variable voltage transformer. After heating to 120° C. the addition of carbon disulfide was started and the rate of addition was such that a slight reflux was obtained. Over a 7½ hour period 20 g. of carbon disulfide was added. Overnight the temperature was gradually raised to 280° C. The reaction mixture was cooled to 120° F. and over a 4 hour period 20 g. of carbon disulfide was added. The reaction mixture was heated at 120–125° C. for two hours and then vacuum was applied at 135–140° C. to remove volatile material. The residue was a dark brown, sticky very viscous liquid which weighed 95 grams.

Toxicity tests were run on the products of Example 1 and on the product of Example 2 as well as on N,N'-di-sec-butyl-p-phenylenediamine the compound from which these materials were derived. The procedure used involved patch tests on human subjects using 5% of the test material in cold cream. Two 48-hour exposures were used and the time between these exposures was about 14 days. The effect after the second exposure was taken as indicative of the sensitization caused by the test compound. Fifteen subjects were used for each test and the reaction of each test subject was indicated by a scale of from 0 to 4 plus signs (+). The following data were obtained:

TABLE I

| Product | Sensitization | | Rating |
|---|---|---|---|
| | Number of subjects | Degree | |
| Example 1 | 4 | ++++ | Moderately sensitizing. |
| | 3 | +++ | |
| | 4 | ++ | |
| | 4 | + | |
| | 1 | ± | |
| | 1 | Negative | |
| Example 2 | 15 | do | Non-sensitizing. |
| N,N'-di-sec-butyl-p-phenylenediamine | 10 | ++++ | Extremely sensitizing. |
| | 1 | +++ | |
| | 3 | ++ | |
| | 1 | + | |

Hence we find product of Example 1 to be a large improvement over N,N'-di-sec-butyl-p-phenylenediamine from the standpoint of sensitization while the product of Example 2 has no sensitizing effect.

The following GR-S tread formula was used to evaluate the products described:

| | |
|---|---|
| GR-S | 100 |
| Black | 45 |
| Zinc oxide | 2.4 |
| Softener | 6.6 |
| Stearic acid | 2.5 |
| Sulfur | 1.7 |
| Accelerator | 1.2 |
| Total | 159.4 |

The stocks were cured for 80 minutes at 280° F. after the following addition to the above masterbatch

TABLE II

| | Blank | Product of Example 1 | N,N'-di-sec-butyl-p-phenylenediamine |
|---|---|---|---|
| Masterbatch | 159.4 | 159.4 | 159.4 |
| Product of Example 1 | | 2.0 | |
| N,N'-di-sec-butyl-p-phenylenediamine | | | 2.0 |
| Total | 159.4 | 161.4 | 161.4 |
| Normal physical properties: | | | |
| Modulus 300% | 925 | 800 | 875 |
| Tensile | 3,525 | 3,625 | 3,475 |
| Percent elongation | 605 | 645 | 620 |
| After aging 2 days at 212° F.: | | | |
| Modulus 300% | 2,125 | 1,700 | 1,925 |
| Tensile | 2,675 | 3,100 | 3,025 |
| Percent elongation | 350 | 435 | 405 |
| Ozone test (60 p.p.h.m., 95° F., 4 hrs.): | | | |
| Static— | | | |
| Size | Severe | None | None |
| Frequency | Mod-num. | | |
| Dynamic— | | | |
| Size | Slight | None | None |
| Frequency | Numerous | | |

Hence it is evident that the product of Example 1 is an effective antiozonant, being as effective in these laboratory tests as the compound from which it was derived. The toxicity tests show it is preferred to the substituted phenylenediamine.

The same GR-S masterbatch was used to prepare the following stocks which were cured 80 minutes at 280° F.:

TABLE III

| | Blank | Product of Example 2 | Product of Example 3 |
|---|---|---|---|
| GR-S masterbatch | 159.4 | 159.4 | 159.4 |
| Product of Example 2 | | 2.0 | |
| Product of Example 3 | | | 2.0 |
| Total | 159.4 | 161.4 | 161.4 |
| Normal physical properties: | | | |
| Modulus 300% | 725 | | 725 |
| Tensile | 3,000 | 1,200 | 3,125 |
| Percent elongation | 590 | 245 | 605 |
| After aging 2 days at 212° F.: | | | |
| 300% modulus | | | 1,800 |
| Tensile strength | 2,075 | 900 | 2,600 |
| Elongation | 285 | 225 | 375 |
| Ozone test (60 p.p.h.m., 95° F., 7 hrs.): | | | |
| Static— | | | |
| Size | Severe | Slight | Slight |
| Frequency | Moderate | (¹) | (¹) |
| Dynamic— | | | |
| Size | Moderate | None | None |
| Frequency | Numerous | | |

¹ Very, very few.

Here it is very evident that the product of Example 2 and the product of Example 3 are both effective antiozonants. The acceleration of cure by the product of Example 2 is evident in the values for the normal physical properties, but this effect could be corrected by the use of less accelerator in the stock in which it is desired to use this particular antiozonant.

The effect of the antiozonant in black sidewall tires using GR-S and reclaim with 3 percent of wax as the blank and N,N'-di-sec-butyl-p-phenylenediamine as the control were subjected to certain aging tests to determine their effect on the physical properties of rubber, and ozone tests were also made.

The following test stock was employed:

| | Parts by weight |
|---|---|
| GR-S | 88.5 |
| Reclaim | 22.9 |
| Carbon black | 32 |
| Zinc oxide | 3 |
| Softener | 10 |
| Sulfur | 2 |
| Accelerator | 1 |
| Antioxidant | 1.6 |
| Wax | 3.0 |
| Total | 164.0 |

Cured 60 minutes at 280° F.

Two parts of the product of Example 1 was added to this masterbatch and compared with the control containing 3 parts of wax alone as protection against ozone cracking. In addition to the usual tests for ozone deterioration, a further test was conducted which combines the conditions of static and dynamic testing, and the results are reported in terms of the code previously described. The comparative results follow:

TABLE IV

| | Masterbatch | Test |
|---|---|---|
| Normal physical properties: | | |
| Modulus 300% | 475 | 525. |
| Tensile | 1,675 | 1,675. |
| Percent elongation | 650 | 620. |
| After aging 2 days at 212° F.: | | |
| Tensile | 1,300 | 1,400. |
| Percent elongation | 310 | 360. |
| Ozone test (60 p.p.h.m. 95° F., 7 hrs.): | | |
| Static— | | |
| Size | Slight | Slight. |
| Frequency | Few | Very few. |
| Dynamic— | | |
| Size | Very severe | Moderate (only on edge of strip). |
| Frequency | Numerous | |
| | Wax | Wax+Example 1 product |
| Static-dynamic (575/2.5–6 hrs.): | | |
| Size | Few | } No cracking. |
| Frequency | Moderate | |

These tire stocks were used in the preparation of a passenger tire, part of the sidewall having the wax alone and another part of the tire sidewall having wax plus the product of Example 1. After 26 months of service the portion of the sidewall having wax alone showed moderately severe cracking while the portion protected by wax plus the product of Example 1 showed only moderate cracking.

Hence it is apparent from the above results that the product of Example 1 not only gave good ozone protection in laboratory testing, but also gave improved protection against ozone cracking in actual tire service.

Natural weathering tests in Akron were carried out using strips of GR-S tread stock in which a blank (no antiozonant) was compared to a stock containing 2 parts of the product of Example 1. For the exposure the dumbbell test strips were stretched on wooden racks to an elongation of 12½ percent. After 28 days the stocks containing the antiozonant of Example 1 showed no cracking while the blank showed numerous severe cracks. After an exposure period of two months, this advantage for the protected stock over the blank was maintained.

The examples and test results are merely illustrative. Other antiozonants may be used, as indicated, and the rubber formulations used for illustrative purposes are in no sense critical. The invention is covered in the claims.

What I claim is:

1. A vulcanized rubber composition containing a small amount of a reaction product of 0.5 to 2.0 moles of carbon disulfide and 1.0 mole of a substance from the group consisting of the substituted ortho-phenylenediamines and the substituted para-phenylenediamines both having the formula $RHN.C_6H_4.NHR'$ in which R and R' are each from the class consisting of alkyl groups of 1 to 12 carbon atoms and cycloalkyl groups of not more than 12 carbon atoms, the rubber being from the class consisting of natural rubber, homopolymers of aliphatic conjugated diolefin hydrocarbons, and copolymers of such hydrocarbons with other ethylenically unsaturated copolymerizable monomeric compounds.

2. A vulcanized rubber composition of claim 1 in which the reaction product is crystalline.

3. A vulcanized rubber composition of claim 1 in which the reaction product is produced from a substituted para-phenylenediamine.

4. A vulcanized rubber composition of claim 1 in which the reaction product is produced from a substituted para-phenylenediamine in which R and R' are both secondary butyl groups.

5. The process which comprises vulcanizing rubber in the presence of a small amount of a reaction product of 0.5 to 2.0 moles of carbon disulfide and 1.0 mole of a substance from the group consisting of the substituted ortho-phenylenediamines and the substituted para-phenylenediamines both having the formula $RHN.C_6H_4.NHR'$ in which R and R' are each from the class consisting of alkyl groups of 1 to 12 carbon atoms, the rubber being from the class consisting of natural rubber, homopolymers of aliphatic conjugated diolefin hydrocarbons, and copolymers of such hydrocarbons with other ethylenically unsaturated copolymerizable monomeric compounds.

6. The process of claim 5 in which the reaction product is crystalline.

7. The process of claim 5 in which the reaction product is produced from a substituted para-phenylenediamine.

8. The process of claim 5 in which the reaction product is produced from a substituted para-phenylenediamine in which R and R' are both secondary butyl groups.

References Cited in the file of this patent

UNITED STATES PATENTS

| | | |
|---|---|---|
| 2,302,749 | Dean | Nov. 24, 1942 |
| 2,309,575 | Coes | Jan. 26, 1943 |
| 2,605,281 | Blinoff | July 29, 1952 |
| 2,651,622 | Hill et al. | Sept. 8, 1953 |
| 2,651,623 | Hill et al. | Sept. 8, 1953 |
| 2,651,667 | Hill et al. | Sept. 8, 1953 |

OTHER REFERENCES

Antioxidants in GR-S Rubber, Shaw et al., Rubber World, vol. 130, August 1954, page 639.